March 8, 1932. H. J. WOOCK 1,848,684
ADJUSTABLE TIRE SUPPORTING STRUCTURE FOR RASPING AND BUFFING MACHINES
Filed Jan. 8, 1930 2 Sheets-Sheet 1

INVENTOR
H. J. Woock
BY
ATTORNEY

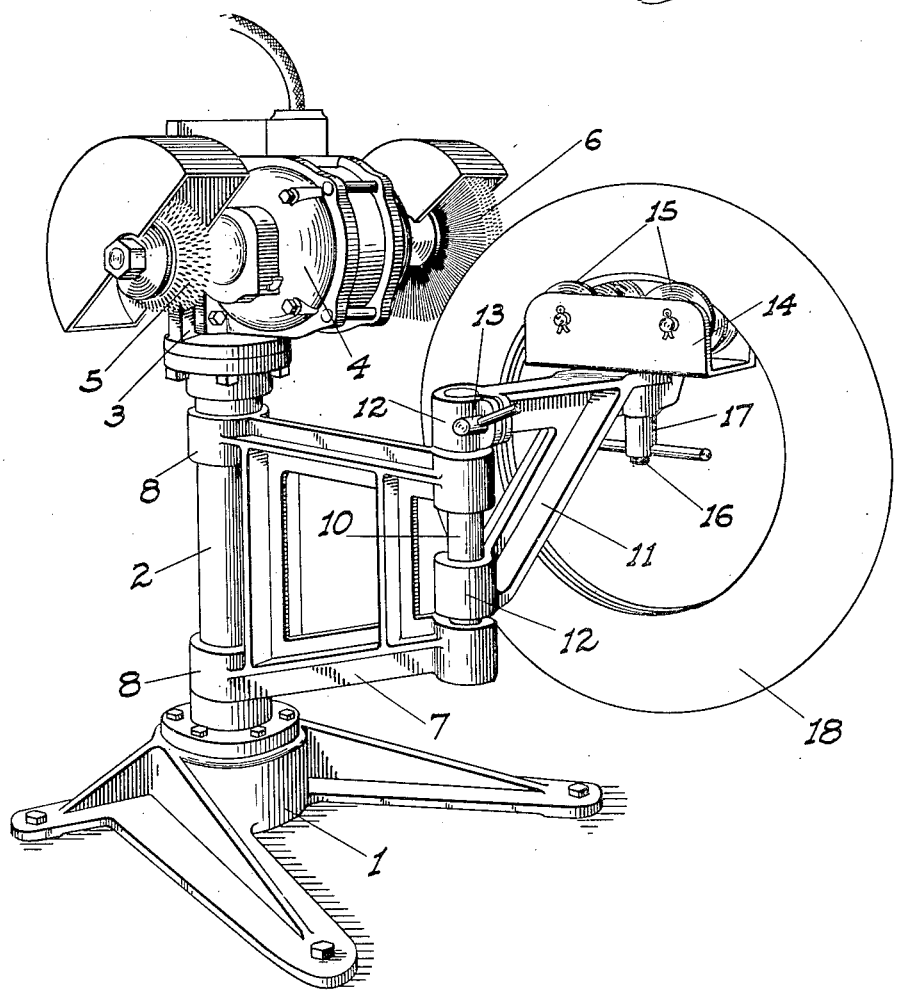

Patented Mar. 8, 1932

1,848,684

UNITED STATES PATENT OFFICE

HERBERT J. WOOCK, OF LODI, CALIFORNIA, ASSIGNOR TO SUPER MOLD CORPORATION, OF RENO, NEVADA, A CORPORATION

ADJUSTABLE TIRE SUPPORTING STRUCTURE FOR RASPING AND BUFFING MACHINES

Application filed January 8, 1930. Serial No. 419,394.

This invention relates to tire supporting devices for use when tires are being rasped and buffed as is necessary in removing the old rubber when perparing the tire for retreading.

Such machines which are now commonly in use for the purpose consist essentially in a rasping wheel and a buffing wheel arranged in separated but somewhat close relation to each other.

The principal object of my invention is to provide a tire supporting structure so arranged in connection with such wheels that a tire may be engaged with one or the other wheel at will, maintained at any angle and turned so that the wheel may work over the entire circumference of the tire; and without any physical effort on the part of the operator being necessary for either operation other than to guide and hold the tire against the wheel and prevent said tire from turning too rapidly. The use of this supporting structure therefor eliminates the crude and inefficient method now in vogue and which necessitates the operator not only having to press the tires against the wheel and at the same time turn the tire, but necessitates him supporting the entire weight of the tire as well. Though my improved device is suitable to all tires its advantages and labor saving features become particularly apparent when handling large truck and similar tires which are very heavy to lift, let alone manipulate as is necessary when once lifted.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 2 is a similar view taken from the other side of the structure showing a tire being buffed.

Figure 1:
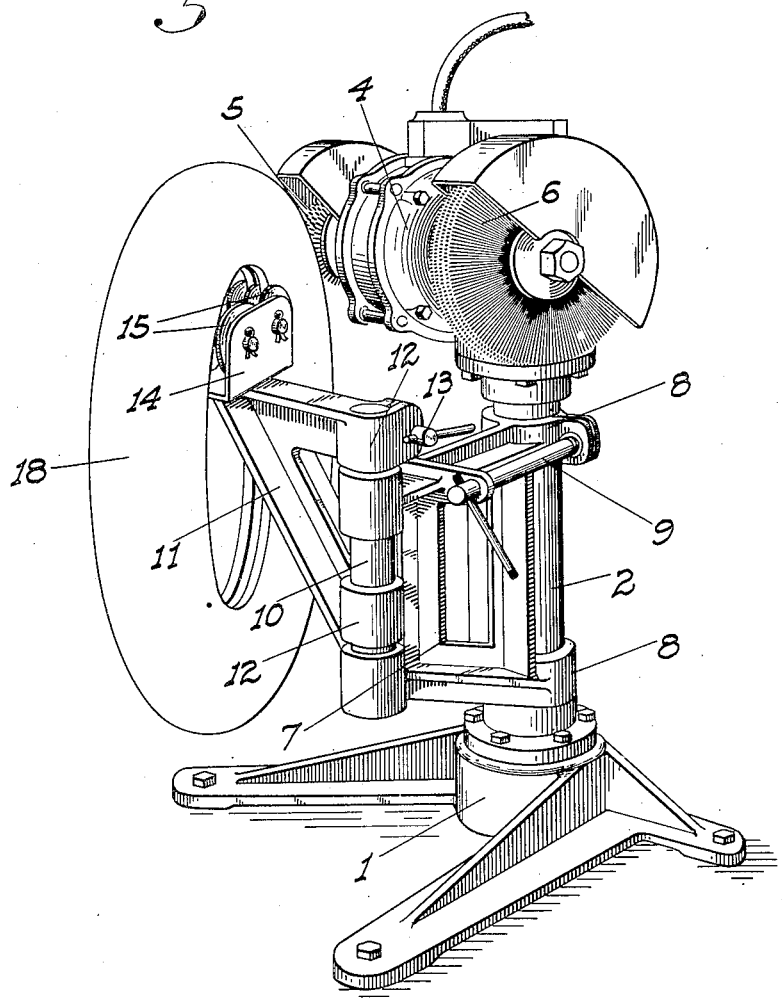
Fig. 1 is a perspective view of my improved apparatus, taken from one side, showing a tire in position to be rasped.

Referring now more particularly to the characters of reference on the drawings, the numeral 1 denotes a suitable and fairly substantial base adapted to be secured to the floor and from which a rigid vertical post 2 projects upwardly. Removably mounted on top of the post is a support 3 for an electric motor 4 which is directly connected at its opposite ends to a rasping wheel 5 and a buffing wheel 6 of standard character. The support is made removable so that if the shop in which the device is to be placed is already provided with such wheels, the tire supporting structure associated with the post and now to be described may be used in connection with the equipment already installed.

The post is circular and turnably mounted thereon is a radially projecting frame 7, disposed in a vertical plane. The upper one of the post engaging collars or hubs 8 of said frame is slit and is provided with a hand actuated clamping screw 9 of common form adapted to be operated from adjacent the outer end of the frame, as shown in Fig. 1.

Fixed in the outer end of said frame is a vertical spindle 10 on which is turnably mounted a radially projecting arm 11 which is preferably of triangular form in a vertical plane, with its upper leg horizontal. The upper one of the spindle engaging collars or hubs 12 of this arm is slit and is provided with a hand actuated clamping screw 13 as shown in Fig. 2. Turnably mounted on the outer end of the arm for movement in a horizontal plane about a vertical axis is a saddle 14 in which a pair of longitudinally spaced flanged rollers 15 are mounted. The axial pin 16 of this saddle is provided with a hand actuated clamping nut 17 thereon.

The height of the saddle and rollers relative to the operating wheels is such that the top of a tire 18 whose beads are resting on the rollers is about on the level with the top of the wheels as shown. The length of the frame 9 and the arm 11 is such that the tire may be moved from one position to another so as to engage either wheel with equal facility as shown; while the almost unlimited adjustment of said frame, the arm, and the saddle independently of each other in a horizontal plane, enables any portion of the rounded transverse outer surface of the tire to be properly engaged with either wheel, as may be desired.

In operation therefore once the tire has been lifted into a supporting position on the saddle rollers, it is only necessary to adjust the various movable parts so that the tire engages the desired wheel at the proper angle. The said parts are then clamped against further movement and the tire may be turned by hand so that the wheel will act over the entire circumferential extent of the same and over the corresponding transverse area. As a result of this structure the physical strain on the operator is relatively slight, and he may devote his entire attention to properly guiding the movement of the tire against the wheel so that the depth of cut and the transverse plane of the same will not vary to any noticeable extent.

It is therefore possible to carry out operations with a much greater degree of accuracy than is at present possible from all angles, and the time of so doing is also very greatly reduced.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A tire supporting structure comprising a vertical post, a radial frame turnably mounted on the post, an arm turnably supported from the outer end of the frame for movement in a horizontal plane, a saddle turnably mounted on the outer end of the arm for movement in a horizontal plane, and horizontally spaced tire-supporting rollers turnably mounted in the saddle.

2. A tire supporting structure including a saddle, means supporting said saddle for free swinging movement in a horizontal plane, and horizontally spaced tire supporting rollers mounted on the saddle.

In testimony whereof I affix my signature.

HERBERT J. WOOCK.